(12) United States Patent
Lukanc et al.

(10) Patent No.: US 7,194,725 B1
(45) Date of Patent: Mar. 20, 2007

(54) SYSTEM AND METHOD FOR DESIGN RULE CREATION AND SELECTION

(75) Inventors: Todd P. Lukanc, San Jose, CA (US); Cyrus E. Tabery, Santa Clara, CA (US); Luigi Capodieci, Santa Cruz, CA (US); Carl Babcock, Campbell, CA (US); Hung-eil Kim, San Jose, CA (US); Christopher A. Spence, Sunnyvale, CA (US); Chris Haidinyak, Santa Cruz, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 368 days.

(21) Appl. No.: 10/817,132

(22) Filed: Apr. 2, 2004

(51) Int. Cl.
*G06F 17/50* (2006.01)

(52) U.S. Cl. .......................... 716/19; 716/4
(58) Field of Classification Search ............... None
See application file for complete search history.

(56) References Cited

U.S. PATENT DOCUMENTS

| | | | |
|---|---|---|---|
| 5,390,131 A * | 2/1995 | Rohrbaugh et al. ............ 716/4 |
| 6,063,132 A * | 5/2000 | DeCamp et al. ............... 716/5 |
| 6,415,421 B2 | 7/2002 | Anderson et al. .............. 716/4 |
| 6,425,113 B1 | 7/2002 | Anderson et al. .............. 716/5 |
| 6,510,730 B1 | 1/2003 | Phan et al. ..................... 73/105 |
| 6,523,162 B1 | 2/2003 | Agrawal et al. ............... 716/19 |
| 6,553,559 B2 * | 4/2003 | Liebmann et al. ............ 716/19 |
| 6,601,231 B2 * | 7/2003 | LaCour ......................... 716/21 |
| 6,611,946 B1 * | 8/2003 | Richardson et al. ........... 716/5 |
| 6,691,297 B1 * | 2/2004 | Misaka et al. ................. 716/21 |
| 6,732,338 B2 * | 5/2004 | Crouse et al. .................. 716/4 |
| 6,748,571 B2 * | 6/2004 | Miwa ............................. 716/4 |
| 6,816,997 B2 * | 11/2004 | Teh et al. ....................... 716/5 |
| 6,899,981 B1 * | 5/2005 | Galan et al. .................... 430/5 |
| 6,952,818 B2 * | 10/2005 | Ikeuchi ......................... 716/21 |
| 2003/0229410 A1* | 12/2003 | Smith et al. .................. 700/109 |
| 2005/0086619 A1* | 4/2005 | Teh et al. ....................... 716/5 |
| 2005/0132306 A1* | 6/2005 | Smith et al. .................... 716/1 |
| 2005/0229125 A1* | 10/2005 | Tabery et al. .................. 716/5 |

* cited by examiner

*Primary Examiner*—Leigh M. Garbowski
(74) *Attorney, Agent, or Firm*—Winstead Sechrest & Minick P.C.

(57) ABSTRACT

A method of producing design rules including generating a plurality of parametrically varying geometric layouts and simulating how each geometric layout will pattern on a wafer. Edges of structures within the simulated geometric layouts can be classified based on manufacturability and design rules can be created to disallow layouts demonstrating poor manufacturability.

22 Claims, 7 Drawing Sheets

SYSTEM AND METHOD FOR DESIGN RULE CREATION AND SELECTION

TECHNICAL FIELD

The present invention relates generally to the field of integrated circuit device design and manufacture and, more particularly, to a system and method for design rule creation and selection.

BACKGROUND

In designing an integrated circuit (IC) device, engineers or designers typically rely on computer design tools to help create an IC schematic or design, including a multitude of individual devices, such as transistors, coupled together to perform a certain function. To actually fabricate the IC device in or on a semiconductor substrate, the IC device schematic must be translated into a physical representation or layout, which itself can then be transferred onto a silicon substrate surface. Computer aided design (CAD) tools, can be used to assist layout designers with translating the discrete circuit elements into shapes, which will embody the devices themselves in the completed IC device. These shapes make up the individual components of the circuit, such as gate electrodes, diffusion regions, metal interconnects.

The software programs employed by the CAD systems to produce layout representations are usually structured to function under a set of predetermined design rules in order to produce a functional circuit. Often, the design rules are determined by certain processing and design limitations based roughly on the patternability of layout designs. For example, design rules may define the space tolerance between devices or interconnect lines.

Once the layout of the circuit has been created, the next step to manufacturing the IC device is to transfer the layout onto a semiconductor substrate. Optical lithography or photolithography is a well-known process for transferring geometric shapes onto the surface on a semiconductor wafer. The photolithography process generally begins with the formation of a photoresist layer on the top surface of a semiconductor substrate or wafer. A reticle or mask having fully light non-transmissive opaque regions, which are usually formed of chrome, and fully light transmissive clear regions, which are usually formed of quartz, is then positioned over the photoresist coated wafer.

The mask is placed between a radiation or light source producing light of a pre-selected wavelength (e.g., ultraviolet light) and an optical lens system, which may form part of a stepper apparatus. When the light from the light source is directed onto the mask, the light is focused to generate a reduced mask image on the wafer, typically using the optical lens system, which contains one or several lenses, filters, and/or mirrors. This light passes through the clear regions of the mask to expose the underlying photoresist layer, and is blocked by the opaque regions of the mask, leaving that underlying portion of the photoresist unexposed. The exposed photoresist layer is then developed, typically through chemical removal of the exposed/non-exposed regions of the photoresist layer. The end result is a semiconductor wafer coated with a photoresist layer exhibiting a desired pattern, which defines the geometries, features, lines and shapes of that layer. This pattern can then be used for etching underlying regions of the wafer.

There is a pervasive trend in the art of IC design and fabrication to increase the density with which various structures are arranged. For example, linewidths and separation between lines is becoming increasingly smaller. With this size reduction, however, various steps within the integrated circuit design and fabrication process become more difficult. For example, as mentioned above, IC device schematics are translated into a layout representation under a set of predetermined design rules. Currently, IC layout design rules are based roughly on the patternability of layout designs, without taking into account many of the layout interactions. This may result in patterns that are "clean" to geometric layout rules, but are very susceptible to bridging or pinching, or patterns that no longer follow desired layer-to-layer expectations due to rounding, end pullback, and/or other interactions not contemplated or otherwise accounted for by the original predetermined design rules. In addition, design rules are often very general (e.g., polysilicon must extend beyond the active layer). However, as the technology continues to shrink, these general design rules do not account for layout interactions. Such problems can exist with respect to providing an optimized layout for a current process technology as well as expanding into a next generation process technology, thereby jeopardizing critical dimension capabilities.

Accordingly, a need exists in the art for a system and method for design rule creation and selection.

SUMMARY OF THE INVENTION

According to one aspect of the invention, the invention is directed to a method of producing an integrated circuit (IC) device layout corresponding to an IC device design. The method can include generating an initial layout corresponding to the IC device design, where the initial layout complies with a predetermined set of design rules. The method can include stimulating how structures within the initial layout will pattern on a wafer. Portions of the simulated layout, which demonstrate poor manufacturability can be identified and a design rule can be created or modified to disallow each portion of the layout identified as demonstrating poor manufacturability.

According to another aspect of the invention, the invention is directed to a method of producing design rules. The method can include generating a plurality of parametrically varying layout patterns and simulating how each layout pattern will pattern on a wafer. Edges of structures within the simulated geometric layouts can be classified based on manufacturability and design rules can be created to disallow layouts demonstrating poor manufacturability.

According to another aspect of the invention, the invention is directed to a method of generating a set of design rules for a next generation technology. The method can include providing a design library of layout patterns corresponding to a current technology and scaling one or more layout patterns of the design library to the next generation technology. Simulation images of the scaled layout patterns can be generated and optical rule checks (ORCs) can be performed on the simulation images. Layout patterns, which fail one or more of the ORCs, can be identified and one or more design rules can be created to disallow the layout patterns identified as failing one or more of the ORCs.

These and other features of the invention are fully described and particularly pointed out in the claims. The following description and annexed drawings set forth in detail certain illustrative embodiments of the invention, these embodiments being indicative of but a few of the various ways in which the principles of the invention may be employed.

BRIEF DESCRIPTION OF DRAWINGS

These and further features of the present invention will be apparent with reference to the following description and drawings, wherein.

DISCLOSURE OF INVENTION

Figure 1:
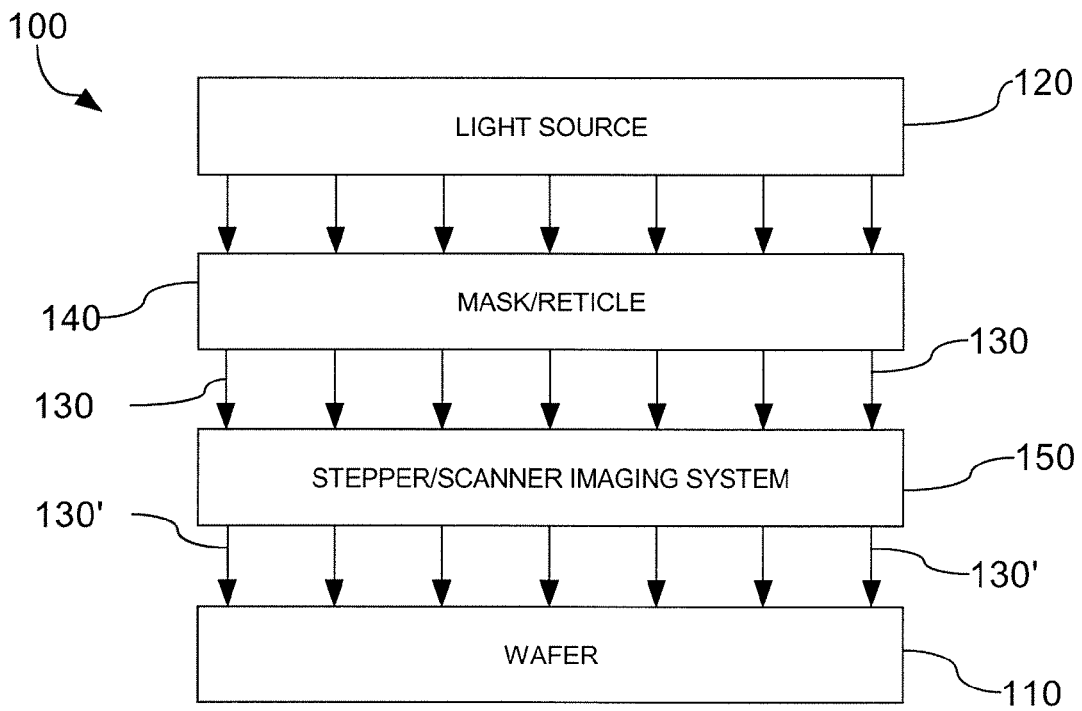
FIG. 1 is a schematic diagram of an exemplary photolithographic processing arrangement.

In the detailed description that follows, corresponding components have been given the same reference numerals regardless of whether they are shown in different embodiments of the present invention. To illustrate the present invention in a clear and concise manner, the drawings may not necessarily be to scale and certain features may be shown in somewhat schematic form.

One aspect of the present invention is directed to a method of producing or otherwise generating an integrated circuit (IC) device layout corresponding to an IC device design using a lithography simulation tool for creating or otherwise modifying design rules. After an initial layout is generated in compliance with a predetermined set of design rules, a simulation tool can be used to simulate how structures within the initial layout will pattern on a wafer. From the simulated layout, portions of the simulated layout that demonstrate poor manufacturability can be identified. From this, one or more design rules can be created and/or modified in order to disallow each portion of the layout identified as demonstrating poor manufacturability. In this manner, the predetermined set of design rules can be augmented or otherwise modified to avoid "weak" patterning regions and result in structures with maximum process margin and minimized designed scale.

The present invention will be described herein in the exemplary context of a design and layout generation process for ultimately patterning a semiconductor layer (e.g., polysilicon) that forms a part of an IC device. Exemplary IC devices can include general use processors made from thousands or millions of transistors, a flash memory array, SRAM (static random-access memory) cells or any other dedicated circuitry. However, one skilled in the art will appreciate that the methods and systems described herein can also be applied to the design process and/or manufacture of any article manufactured using photolithography, such as micromachines, disk drive heads, gene chips, microelectromechanical systems (MEMS) and so forth.

With reference to FIG. 1, an exemplary photolithographic processing arrangement for manufacturing or otherwise processing integrated circuit (IC) devices designed and layed out in accordance with the present invention is provided.

The processing arrangement can include an optical system 100 used to image a pattern onto a wafer 110. The general arrangement of the optical system 100 is relatively well known in the art and will not be described in great detail. The optical system 100 can include a light source 120 for directing light or other actinic energy 130 of a pre-determined wavelength toward a mask or reticle 140. The light energy 130 can be, for example, partially coherent light. An exemplary wavelength for the light energy 130 can be about 193 nm, as produced by an argon-fluoride laser. The optical system 100 can be arranged such that the light energy 130 can be used to produce IC nodes on the wafer 110 having a critical dimension (CD) of, for example, 130 nm, 100 nm, 65 nm and so forth. It is also contemplated that other wavelengths, such as 157 nm and extreme-ultraviolet wavelengths, can also be used to produce even smaller CDs, such as 45 nm.

The reticle 140 blocks light energy 130 from certain pre-determined portions of the wafer 110 such that a light pattern 130' defined by the reticle layout is transferred to the wafer 110. A stepper/scanner imaging system 150 sequentially directs the light pattern 130' transmitted by the reticle 140 to a series of desired locations on the wafer 110.

Figure 2:
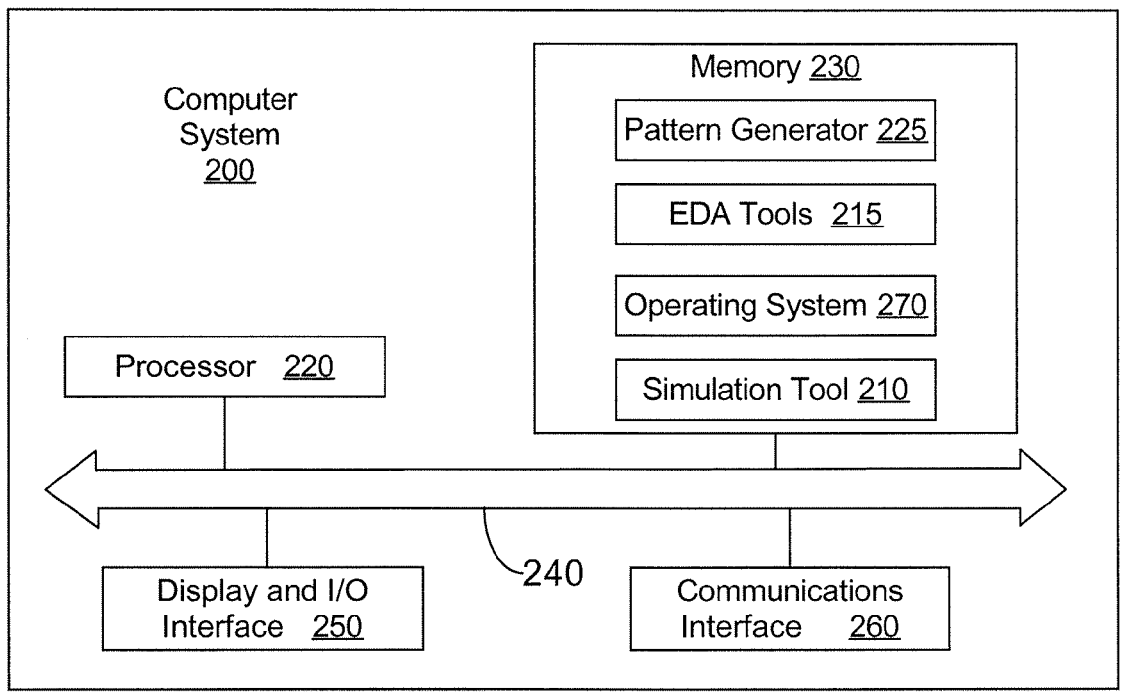
FIG. 2 is a schematic block diagram of a computer system capable of executing a simulation tool and pattern generator in accordance with the present invention.

Turning now to FIG. 2, a schematic block diagram of a computer system 200 capable of executing a lithography simulation tool 210, a layout test pattern generator 225, and other design processes using electronic design automation (EDA) tools 215 in accordance with the present invention is illustrated. As indicated, the simulation tool 210 can be used to generate a simulation image and identify portions of a layout including structures exhibiting or otherwise demonstrating poor manufacturability. In one embodiment, the simulation tool 210 is embodied as a computer program (e.g., a software application including a compilation of executable code). As described more fully below, the layout test pattern generator 225 can be used to generate a plurality of parametrically varying layout test patterns.

To execute the simulation tool 210 and/or the layout test pattern generator 225, the computer system 200 can include one or more processors 220 used to execute instructions that carry out a specified logic routine. In addition, the computer system 200 can include a memory 230 for storing data, software, logic routine instructions, computer programs, files, operating system instructions, and the like. The memory 230 can comprise several devices and includes, for example, volatile and non-volatile memory components. As used herein, the memory 230 can include, for example, random access memory (RAM), read-only memory (ROM), hard disks, floppy disks, compact disks (e.g., CD-ROM, DVD-ROM, CD-RW, etc.), tapes, and/or other memory components, plus associated drives and players for these memory types. The processor 220 and the memory 230 are coupled using a local interface 240. The local interface 240 can be, for example, a data bus, accompanying control bus, a network, or other subsystem.

The computer system 200 can include various video and input/output interfaces 250 as well as one or more communications interfaces 260. The interfaces 250 can be used to couple the computer system 200 to various peripherals and networked devices, such as a display (e.g., a CRT display or LCD display), a keyboard, a mouse, a microphone, a camera, a scanner, a printer, a speaker, and so forth. The communications interfaces 260 can be comprised of, for example, a modem and/or network interface card, and can enable the computer system 200 to send and receive data signals, voice signals, video signals, and the like via an external network, such as the Internet, a wide area network (WAN), a local area network (LAN), direct data link, or similar wired or wireless system.

The memory 230 can store an operating system 270 that is executed by the processor 220 to control the allocation and usage of resources in the computer system 200. Specifically, the operating system 270 controls the allocation and usage of the memory 230, the processing time of a processor 220 dedicated to various applications being executed by the processor 220, and the peripheral devices, as well as performing other functionality. In this manner, the operating system 270 serves as the foundation on which applications, such as the simulation tool 210, depend as is generally known by those of ordinary skill in the art.

Figure 3:
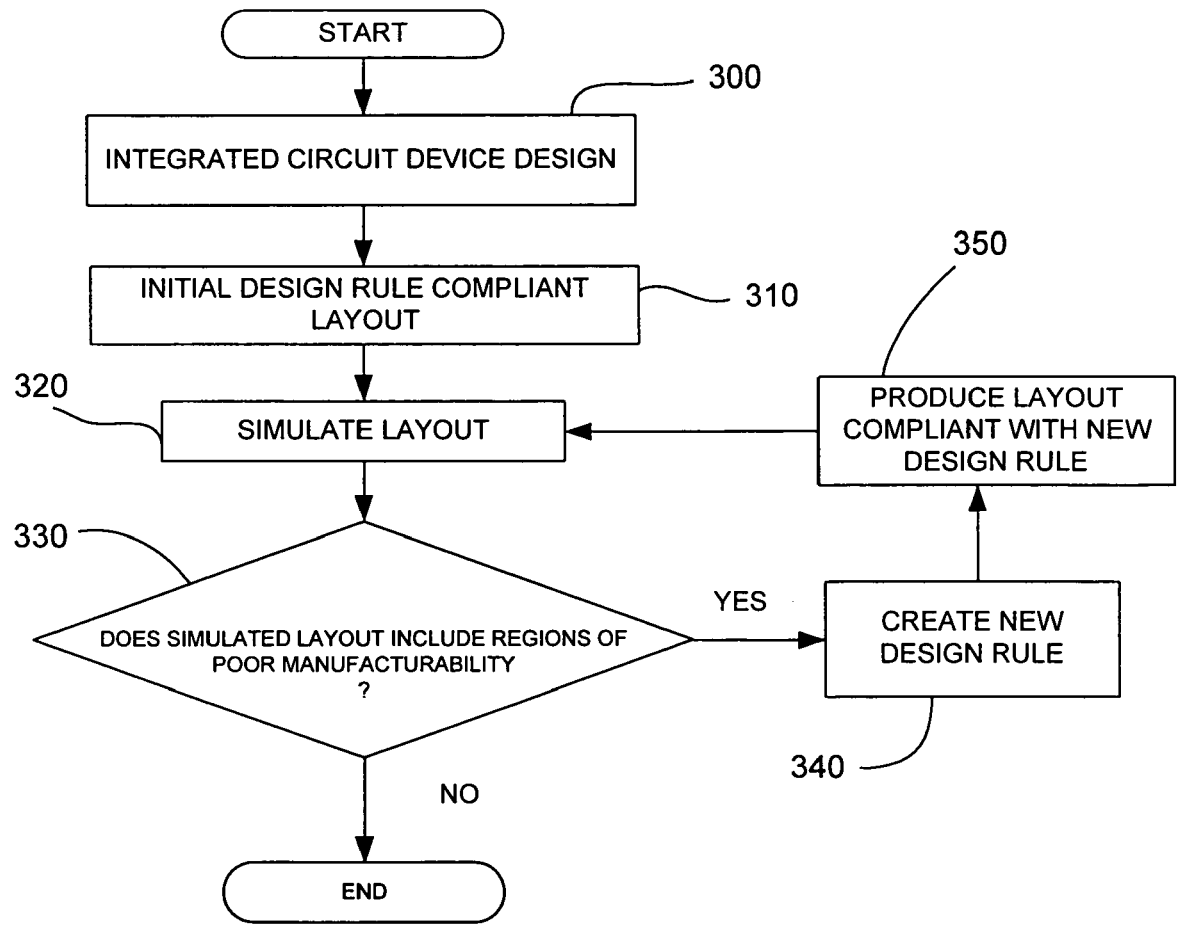
FIG. 3 is a flow chart illustrating a method of producing a layout representation corresponding to an integrated circuit (IC) device design in accordance with the present invention.

With reference now to FIG. 3, one embodiment of a method for producing an integrated circuit (IC) device layout corresponding to an IC device design is provided. The flow chart of FIG. 3 can be thought of as depicting steps of a method implemented on or with the assistance of the computer system 200 of FIG. 2.

At step 300, an integrated circuit device design or schematic can be provided by an engineer or designer. Alternatively, an IC device design can be received from an outside source for processing in a manner described herein. It is to be appreciated that, in one embodiment, exemplary IC devices can include general use processors made from thousands or millions of transistors, a flash memory array, SRAM (static random-access memory) cells or any other dedicated circuitry. A designer can provide or otherwise design an IC device having a desired set of performance specifications and/or electrical characteristics. The IC device design can be embodied in a high-level description, commonly referred to as a "netlist." The netlist can be described in languages, such as VHDL and Verilog®, for example.

At step 310, the IC device design can be converted or otherwise translated into a physical representation or layout. The layout can define the specific dimensions of gates, isolation regions, interconnects, contacts and other device elements that form the physical structures within the device design. These can be represented by a variety of shapes, polygonal, curvilinear and the like.

In one embodiment, the initial layout can be generated or otherwise produced in accordance or compliance with a predetermined set of design rules. It is to be appreciated that the predetermined set of design rules can be determined based on certain processing and/or design limitations, based roughly on the patternability of layout designs. For example, the design rules can define the space tolerance between adjacent structures or devices, interconnect lines and the like. In addition, the design rules can include constraints on layer-to-layer relationships between, for example, active, metal and polysilicon layers. It is also to be appreciated that the predetermined set of design rules can be rather general in nature. This may be due to the fact that, for past and present technologies, layout interactions between adjacent structures as well as defects, such as rounding and end pullback, were not a significant factor or source of distortion. For example, one general design rule may include a constraint or requirement that the polysilicon layer extend beyond the active layer, without any further specificity. While such a general design rule may have been effective for the past and present technologies, designs and layouts, such a general design rule may be followed, yet permit layout designs including defects, such as bridging or pinching.

The layout can be embodied in a layout data file or data set (also referred to as a target database). The layout data file can include data layers that correspond to the actual layers to be fabricated in the IC device. The layout data file can also include cells, which defines sets of particular devices within the circuit or IC device design. A cell can include all of the shapes on all of the layers required for the fabrication of the devices it contains. It is to be appreciated that cells can be nested or otherwise contained within other cells, often in very intricate arrangements. The structure of cells is commonly referred to as a data hierarchy. Typical formats for the shapes of a layout data file or target database include GDS II or CIF.

At step 320, the initial layout, generated at step 310, can be simulated. Simulating the initial layout can include producing or otherwise generating a simulation image, which corresponds to a simulation of an image that would be printed on a wafer if the wafer was exposed to an illumination source directed through a mask including the initial layout. Alternatively, the simulation image can correspond to a simulation of a photoresist layer that would be patterned according to exposure to an illumination source directed through a mask including the initial layout. As such, the real pattern of structures within the initial layout can be simulated as a result of one or more of resolution enhancement technologies (RET), optical proximity corrections (OPC), proximity to other structures, density of structures, corner rounding, as well as any other parameters that can alter the final image (i.e., the wafer image) as compared to the drawn layout. In addition, the wafer image can also be evaluated with respect to exposure and/or focus variations or other process variations that may alter or otherwise shift the edge placement of structures within the layout with respect to the "target image."

The layout can be simulated using one of a variety of commercially available simulation tools, such as, for example, CALIBRE® from Mentor Graphics Corp. Such simulation tools are useful for simulating or otherwise predicting how structures within the layout, corresponding to the device design, will actually pattern and/or what manufacturing defects may occur during lithographic processing.

At step 330, the simulated layout (step 320) can be examined to determine whether it includes areas, regions or features (e.g., structure edges), which demonstrate or are otherwise indicative of poor manufacturability. In one embodiment, all structure edges within the layout can be classified based on manufacturability. Regions, features or edges demonstrating or exhibiting poor manufacturability can be determined by applying one or more optical rule checking (ORC) checks. ORC can be performed based on one or more process-related parameters, also referred to as metrics. These process-related metrics can be indicative of the manufacturability of a layout or a portion thereof. In one embodiment, optical rule checking can be performed based on, but not limited to, aerial image metrics, such as contrast, image log slope, image slope, minimum intensity, maximum intensity, and/or intensity at a distance (e.g., 0–1000 nm). Alternatively, simulators may also simulate final resist or etched images and base manufacturability on at least one of resist height, sidewall angle, and edge placement. Latent image metrics may also be employed, such as photo active compound (PAC) or photoacid (PA) gradient, maximum PAC concentration, and minimum PAC concentration. In addition, post exposure baked metrics of image transfer quality may also be used, including, deprotected sites, such as gradients or minimum/maximum values or values at edges.

If the optical rule checking associated with step 330 does not indicate the presence of any regions, areas and/or features exhibiting poor manufacturability, the method, as described herein, can end. Otherwise, once regions, areas, and/or features exhibiting poor manufacturability are identified, one or more new design rules can be created at step 340. Alternatively, existing design rules can be modified. Such design rules can be created or otherwise modified to disallow regions, areas, and/or features of a layout exhibiting poor manufacturability. For example, a general predetermined design rule may require a certain spacing between adjacent structures or a certain relationship between layers within a layout (e.g., a polysilicon layer and an active layer). However, through the methodology described herein, it may be determined that the aforementioned general design rule only provides a structure with acceptable manufacturability when adjacent structures having certain dimensions and/or properties are present. In such a case, a new design rule can be created to prohibit situations in which the arrangement of structures or layers provides a layout exhibiting poor manufacturability. Alternatively, the general design rule may be modified or otherwise made more specific to disallow layouts or portions thereof demonstrating poor manufacturability.

Once one or more new design rules are created (step 340) and/or existing design rules are modified, a layout, which is compliant with all new design rules, can be produced at step 350. At this point, the new layout can be simulated (step 320) and the optical rule checking (step 330) can be performed as described above. It is to be appreciated that this methodology may be performed iteratively until a layout demonstrating enhanced and/or improved manufacturability is produced.

It is to be appreciated that the methodology described above involves an evaluation of predetermined or existing design rules according to process-calibrated ORC checks (i.e., checks in which the RET and/or lithography system parameters are held fixed or within a fixed range). However, as is described more fully below, there is room for iteration between determining design rules and determining RET strategies in order to maximize manufacturability as well as minimize chip size.

Figure 4:
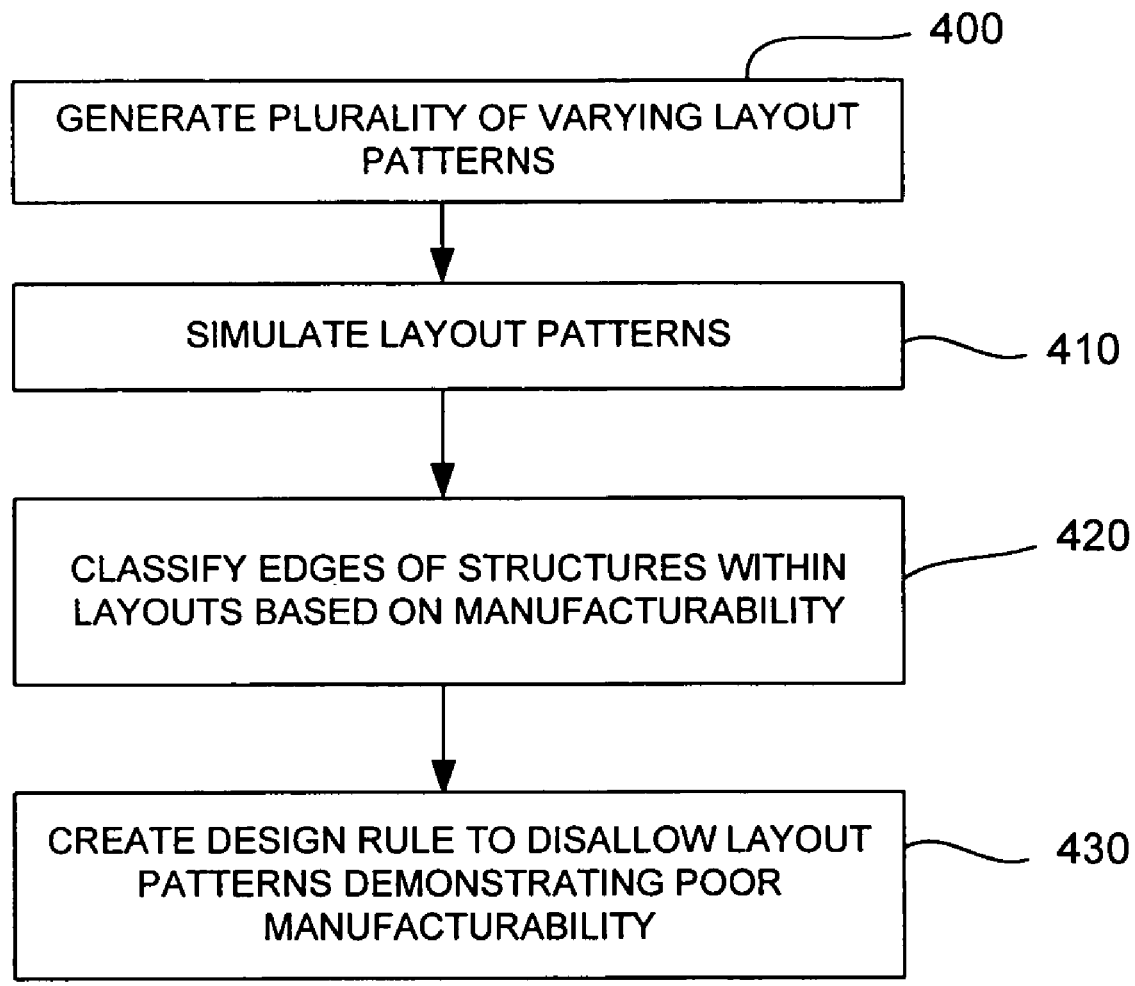
FIG. 4 is a flow chart illustrating a method of creating design rules in accordance with the present invention.

With reference now to FIG. 4, a method of producing or otherwise modifying design rules is provided. As discussed above with reference to FIG. 3, the flow chart of FIG. 4 can be thought of as depicting steps of a method implemented on or with the assistance of the computer system 200 of FIG. 2.

At step 400, a plurality of parametrically varying geometric layouts or layout patterns (e.g., layout test patterns can be generated). In one embodiment, the plurality of parametrically varying layout test patterns can be generated in the form of GDS layout files from one or more design spreadsheets. These layout files can be created using polygon creation commands in programming languages, such as, TCL, AMPLE or another appropriate language. Alternatively, commercially available software tools from Mentor Graphics Corp., Cadence or Synopsys can be employed.

Figure 5:
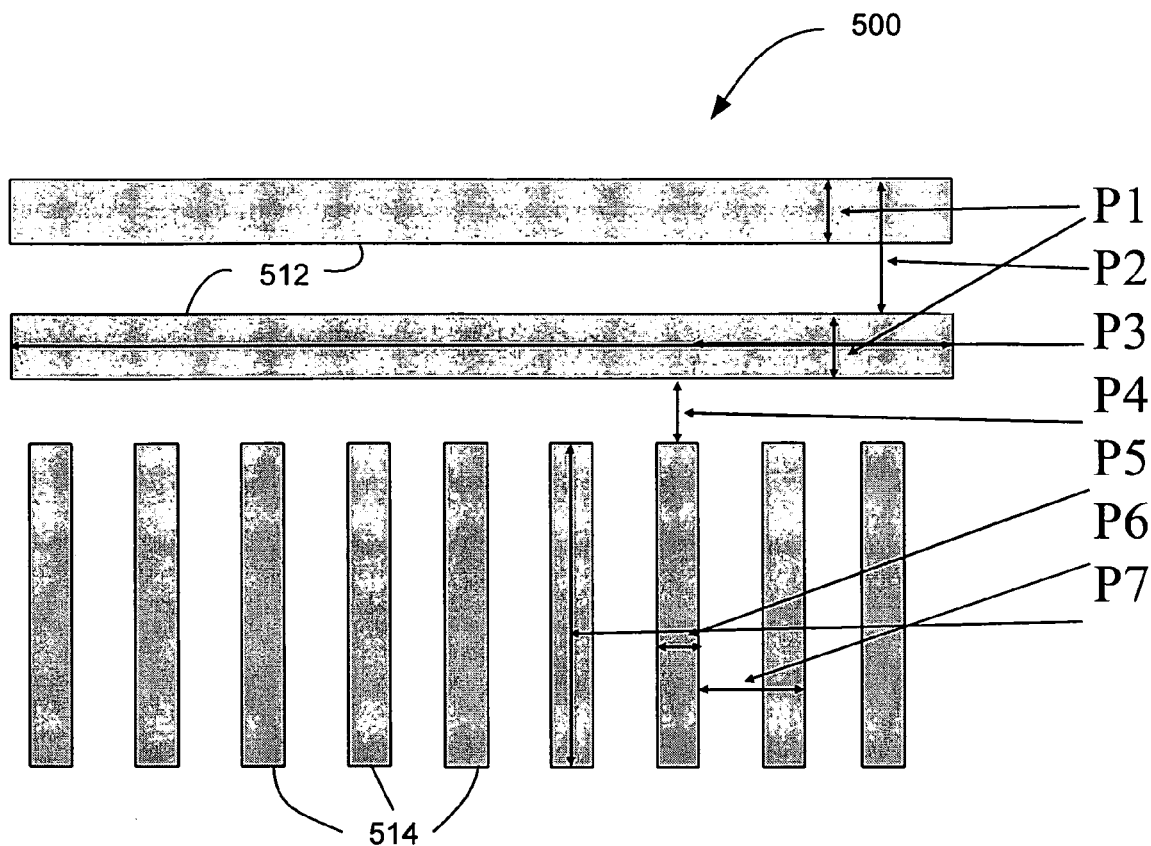
FIG. 5 is a schematic diagram of an exemplary tip-line layout test pattern and design spreadsheet for use with the present invention.

FIG. 5 illustrates an exemplary layout test pattern 500 as well as an associated exemplary design spreadsheet 510 from which the plurality of parametrically varying geometric layouts (in the form of layout data files) are created. It is to be appreciated that the exemplary geometric layout or layout test pattern can be selected and/or generated in order to study, evaluate and/or modify one or more existing design rules (or design rule sets), general or otherwise, as well as to create one or more new design rules.

For example, FIG. 5 illustrates a layout test pattern 500, which includes a pair of substantially horizontal structures 512 and a plurality of substantially vertical structures 514. Such a layout pattern can be referred to as a tip-line pattern.

It is to be appreciated that other layout test patterns can be provided to test one or more design rules and how well they direct layout designers as to layout interactions between adjacent structures of a given scale. Such patterns can include tip—tip patterns, line/space patterns and the like.

In the exemplary embodiment illustrated in FIG. 5, the layout test pattern 500 is accompanied by a design spreadsheet 510. The design spreadsheet can include a number of parameters to be systematically varied for each variation of the test layout pattern. Parameters to be varied can include, but are not limited to, pitch, linewidth, tip-to-tip distance, length, amount of overlap between adjacent layers, sizing between adjacent layers, and the like. It is to be appreciated that an exemplary design spreadsheet can include up to 100 parameters or more.

The exemplary embodiment illustrated in FIG. 5 includes seven different parameters to be varied. The seven parameters are designated as P1, P2 . . . P7. In the illustrated embodiment, P1 is linewidth of one or both of the horizontal structures 512, P2 is the pitch of the horizontal structures 512, P3 is the length of one or more of the horizontal structures 512, P4 is the tip-line spacing between one or more of the vertical structures 514 and one or more of the horizontal structures 512, P5 is the linewidth of one or more of the vertical structures 514, P6 is the pitch of the vertical structures 514, and P7 is the length of one or more of the vertical structures 514. It is to be appreciated that greater or fewer numbers of parameters can be varied and tested without departing from the scope of the present invention.

In this exemplary embodiment, the design spreadsheet includes a minimum value and a maximum value for each of the parameters P1–P7 described above as well as an incremental step size for variations of each parameter. For purposes of this exemplary embodiment, the values for minimum value, maximum value and step size have units of microns. The last column of the design spreadsheet 510 provides the number of variations for a particular parameter, given the chosen minimum and maximum values and the chosen step size. For example, the parameter indicated by P1 has a minimum value of 0.08 microns, a maximum value of 0.16 microns and a step size of 0.04 nanometers. As indicated in the design spreadsheet 510, this combination provides three variations for the parameter indicated by P1.

As discussed above, the design spreadsheet can be processed to automatically generate variations of the chosen layout test pattern, thereby, providing a plurality of parametrically varying layout patterns. It is to be appreciated that this technique allows for the efficient generation of a large number of parametrically varying layout patterns (in this example, over 15,000), each having the same basic layout structure (e.g., a tip-line pattern). Stated differently, at step 400, a target database may be created, which includes parametric design spaces populated by test structures that explore the shape and interfeature distance space (design space). While step 400 has been described with respect to generating parametrically varying variations of generic layout test patterns, it is to be appreciated that known problem layouts or cells (e.g., bitcells) can be provided and parametrically varying variations thereof can be generated without departing from the scope of the present invention.

Referring again to FIG. 4, the plurality of parametrically varying layout test patterns can be simulated at step 410. As discussed above, simulating the layout patterns can include producing or otherwise generating simulation images, which correspond to simulations of images that would be printed on a wafer if the wafer was exposed to an illumination source directed through a mask including the layout pattern.

The real pattern of structures within each layout pattern can be simulated as a result of one or more of resolution enhancement technologies (RET), optical proximity corrections (OPC), proximity to other structures, density of structures, corner rounding, as well as any other parameters that can alter the final image (i.e., the wafer image) as compared to the drawn layout. In one embodiment, OPC and RET techniques can be applied to the GDS layout data files prior to simulation. Artisans will appreciate that OPC can include the adding of dark regions to and/or the subtracting of dark regions from portions of a reticle to mitigate the distorting effects of diffraction in scattering. The layout patterns can be simulated using one of a variety of commercially available simulation tools, such as, for example, CALIBRE® from Mentor Graphics Corp.

At step 420, edges of the structures within the plurality of simulated parametrically varying layout patterns can be classified or otherwise evaluated based on manufacturability. Regions, features and/or edges demonstrating or exhibiting poor manufacturability can be determined and/or identified by applying one or more ORC checks. As discussed above, the ORC checks can be performed based on aerial image metrics, such as contrast, image log slope, image slope, minimum intensity, maximum intensity, and the like. Alternatively, as discussed above, resist or etched image metrics, latent image metrics, post exposure bake metrics, and/or other appropriate metrics can also be employed without departing from the scope of the present invention.

In one embodiment, one or more graphical representations can be generated or otherwise provided in connection with classifying or evaluating, based on manufacturability, edges of structures within the simulated parametrically varying layout patterns (step 420). Each graphical representation can illustrate portions of the design space (made up of the parametrically varying layout patterns) based on manufacturability. The graphical representations can include, but are not limited to, graphical maps, histograms, response curves, and the like.

Figure 6:
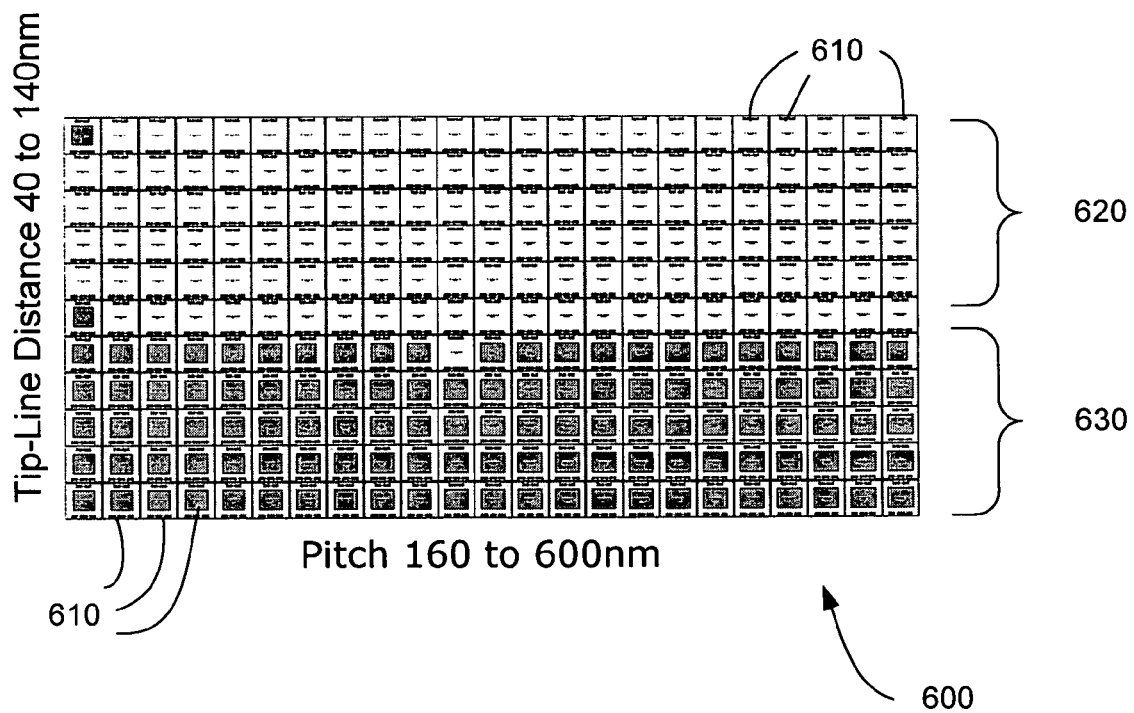
FIGS. 6 & 7 are exemplary graphical representations, which can be indicative of a design space explored in accordance with the present invention.

FIG. 6 is an exemplary graphical map 600 of a portion of the design space discussed above in connection with FIG. 5. In one embodiment, the graphical map 600 can include a matrix-like array of identifiers 610, with each identifier 610 being representative of or corresponding to one or more layout patterns having a given combination of parameters. The graphical map of FIG. 6 illustrates a classification based on manufacturability for the simulated layout patterns having a combination of parameter P4 (tip-line spacing between one or more vertical structures 514 and one or more of the horizontal structures 512) and parameter P6 (pitch of the vertical structures 514). In this exemplary embodiment, FIG. 6 includes 11×13 identifiers 610, where each identifier 610 is representative of or corresponds to the manufacturability of each set of layout patterns having a given P4 value and a given P6 value. While FIG. 6 illustrates a portion of design space based on two parameters, P4 and P6, it is to be appreciated that greater or fewer parameters could be illustrated on a graphical map without departing from the scope of the present invention. In addition, any suitable identifier can be used in place of the matrix-like arrangement of squares illustrated in FIG. 6.

In this exemplary embodiment, the simulated layout patterns were subjected to ORC checks (process-calibrated for 75 nanometers defocus) of image log slope (ILS) and line end contrast. Of course, as is described above, other metrics (aerial or otherwise) can be employed for ORC checks. Identifiers that represent or correspond to layout patterns that demonstrated poor manufacturability (by failing one or both of the aforementioned ORC checks) have been darkened, while layout patterns that passed both ORC checks remain undarkened.

As such, it can be seen that, for this exemplary layout test pattern 500, layout patterns 620 having a P4 value of greater than about 90 nanometers demonstrated acceptable manufacturability (at least according to the ORC checks employed), while layout patterns 630 having a P4 value of less than about 90 nanometers did not demonstrate acceptable manufacturability. In this exemplary embodiment, the manufacturability of the layout test pattern did not depend on the P6 parameter.

Figure 7:
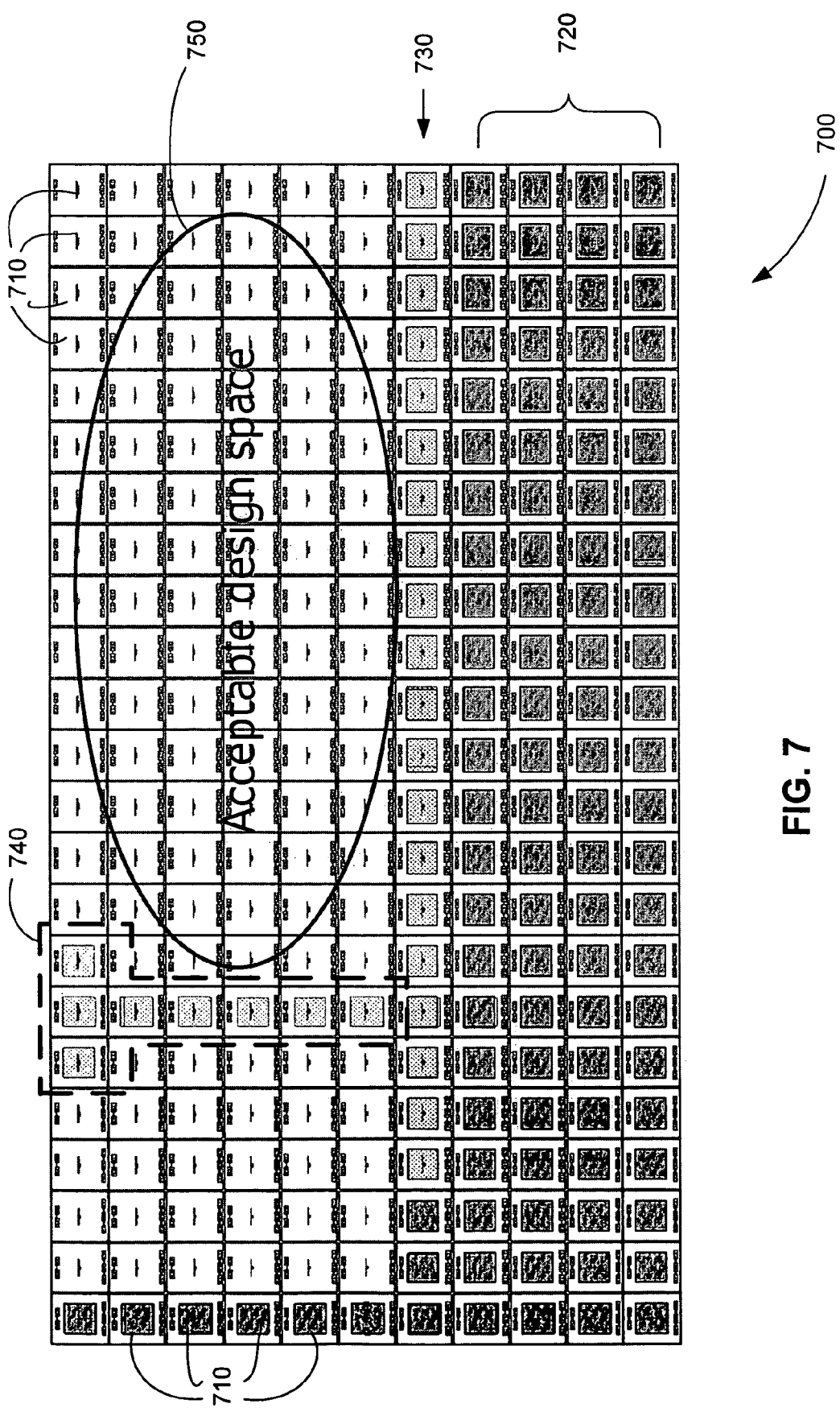

FIG. 7 is another exemplary graphical map 700 of a portion of a design space. The graphical map 700 can include a plurality of identifiers 710, which are representative of or correspond to one or more parametrically varying layout patterns having a given combination of two or more parameters. Such a graphical map can be generated or otherwise provided to illustrate the classification or evaluation of the edges of structures within a plurality of parametrically varying layout patterns. Alternatively, the graphical map can illustrate the classification or evaluation of other features or attributes of structures within the plurality of parametrically varying layout patterns.

As described above, the edges of structures within the various simulated layout patterns can be classified by performing one or more ORC checks. Based on the results of each of the one or more ORC checks, the identifiers 710 can be darkened or otherwise altered to indicate poor or unacceptable manufacturability as well as good or acceptable manufacturability. For example, the graphical map 700 includes a plurality of identifiers, which can be indicative of the results of at least three different ORC checks (e.g., checks based on maximum intensity, minimum intensity, and minimum slope of edge intensity). After the first ORC check (e.g., maximum intensity) is performed on the plurality of simulated layout patterns having the combination of parameters illustrated in the design space, any identifiers representing or corresponding to layout patterns failing the first ORC check can be darkened or otherwise identified. These are designated by reference numeral 720 in FIG. 7. Similarly, a second ORC check (e.g., minimum intensity) can be performed on the plurality of simulated layout patterns and identifiers representing or corresponding to layout patterns failing the second ORC check can be darkened or otherwise identified. These are designated by reference numeral 730 in FIG. 7. Finally, a third ORC check (e.g., minimum slope of edge intensity) can be performed on the plurality of simulated layout patterns and identifiers representing or corresponding to layout patterns failing the third ORC check can be darkened or otherwise identified. These are designated by reference numeral 740 in FIG. 7. It is to be appreciated that the darkening or otherwise identifying can be different depending upon which ORC check is failed. Once all of the desired ORC checks are performed, the remaining undarkened identifiers can be thought of as indicating a design space 750 that is acceptable from a manufacturing point of view. Conversely, the darkened or otherwise identified identifiers can be thought of as indicating a design space that is unacceptable from a manufacturing point of view.

Referring again to FIG. 4, once the edges of structures within the simulated layout patterns have been classified or otherwise evaluated (step 420), one or more design rules can be created at step 430 to disallow layout patterns that demonstrate poor manufacturability (e.g., by failing one or more ORC checks). Alternatively, some or all of the existing design rules can be modified to disallow layout patterns that demonstrate poor manufacturability.

For example, referring again to FIG. 5 and FIG. 6, one or more design rules can be created or otherwise modified to disallow the exemplary layout test pattern 500 (or a portion thereof) having a tip-line spacing of less than about 90 nanometers. Alternatively, if a general design rule to this effect already exists, the design rule may be modified or further specified to disallow such a layout when other structures within the layout have certain dimensions and or spacing (as determined in accordance with step 420).

Figure 8:
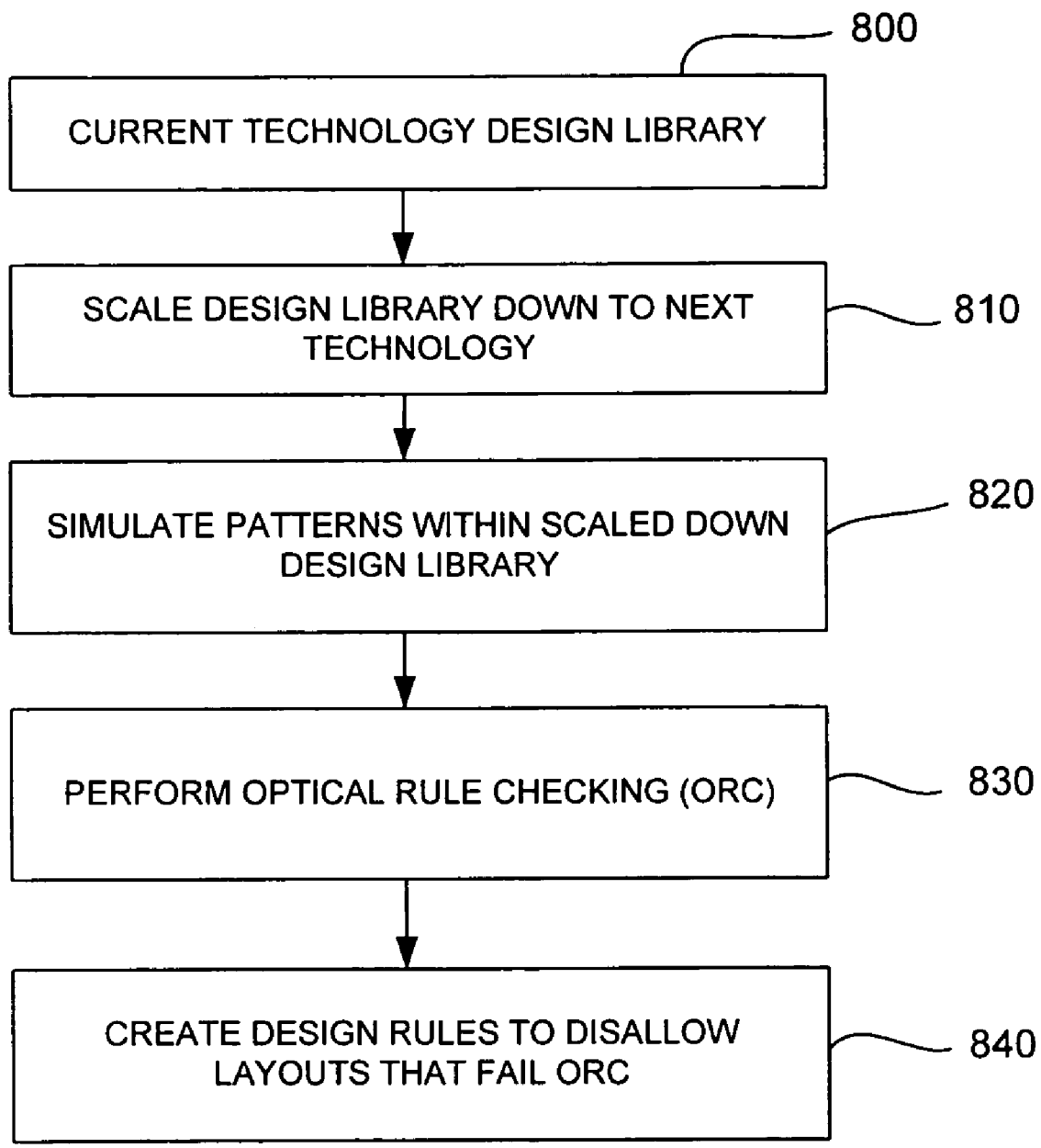
FIG. 8 is a flow chart illustrating a method of generating a set of design rules for a next generation technology in accordance with the present invention.

With reference now to FIG. 8, a method of generating a set of design rules for a next generation technology is provided. FIG. 8 can be thought of as depicting steps of a method implemented on or with the assistance of the computer system 200 of FIG. 2.

The method can begin at step 800 where a current technology or existing design library is selected or otherwise provided. The existing design library can include generic patterns, such as those described more fully above with reference to FIG. 5, known problem cells (e.g., bitcells), and/or other patterns or layouts within a design library for a plurality of other devices.

At step 810, the existing design library (and the layouts contained therein) can be scaled down or otherwise shrunk to a desired technology. This can include reducing or otherwise modifying a scale factor associated with the current technology and/or reducing sizes of features and/or spacing between features. It is to be appreciated that this scaling down may cause additional layout interactions and/or manufacturing defects never before contemplated nor realized. In one embodiment, parameterized cells can be scaled and tested with different illumination settings to look at "what ifs" (in order to see how things can be pushed). Alternatively, the next technology being investigated may be defined by a new set of initial rules, rather than a scaling of a current technology. In such a case, the new rules may come from scaling of cells and pushing illumination to find the breaking point. For example, a new condition may allow spaces to be defined much smaller, but lines may require more room, thereby providing a smaller combined line/space and a new technology node.

At step 820, the layout patterns within the scaled down design library can be simulated. As discussed above, simulating the layout patterns can include producing or otherwise generating simulation images, which correspond to simulations of images that would be printed on a wafer if the wafer was exposed to an illumination source directed through a mask including the layout pattern. The real pattern of structures within each layout pattern can be simulated as a result of one or more of RET, OPC, proximity to other structures, density of structures, corner rounding, as well as any other parameters that can alter the final image (i.e., the wafer image as compared to the drawn layout). It is to be appreciated that the simulations can be performed to account for improvements in the illuminator or other hardware components of the lithography processing arrangement (actual improvements or anticipated improvements). In addition, the simulations of the layout patterns within the scaled down design library can be performed to account for other process-related improvements (actual improvements or anticipated improvements), such as, for example, improved photoresist performance and the like. The layout patterns can be simulated using one of a variety of commercially available simulation tools, such as, for example, CALIBRE® from Mentor Graphics Corp.

At step 830, ORC checks can be performed on the simulated layout patterns (step 820). The ORC checks can be performed in order to identify regions, features and/or edges demonstrating or exhibiting poor manufacturability. As discussed above, the ORC checks can be performed based on aerial image metrics, such as contrast, image log slope, image slope, minimum intensity, maximum intensity, and the like. Alternatively, as discussed above, resist or etched image metrics, latent image metrics, post exposure bake metrics and/or other appropriate metrics can also be employed without departing from the scope of the present invention. Optionally, and as discussed more fully above with reference to FIGS. 6 & 7, appropriate graphical representations can be generated to illustrate one or more results of the ORC checks.

At step 840, once the ORC has been performed (step 830), one or more design rules can be created to disallow layout patterns that failed one or more of the ORCs. Alternatively, some or all of the existing design rules (i.e., the design rules corresponding to the existing technology design library) can be modified to disallow layout patterns that failed one or more of the ORCs. It is to be appreciated that the newly created and/or otherwise modified design rules can function as a starting set of design rules for the next generation technology. Of course, such design rules could be further modified and/or enhanced following one or more of the methodologies described more fully above.

While the present invention has been described with respect to creating or otherwise modifying design rules using a process-calibrated set of ORC checks (i.e., ORC checks for a fixed set of RET and/or lithography system parameters), it is to be appreciated that layout patterns can be evaluated and/or optimized within respect to RET strategies as well as process-related parameters, including, but not limited to numerical aperture (NA) illuminator source shape, illuminator sigma values, mask types, and the like. In other words, there is room for iteration between determining design rules and determining RET strategy. Optimum design rules and RET strategy can maximize the manufacturability and minimize the chip size for a particular device.

Although the illustrations appended hereto show a specific order of executing functional logic blocks, the order of execution of the blocks can be changed relative to the order shown. Also, two or more blocks shown in succession can be executed concurrently or with partial concurrence. Certain blocks may also be omitted. In addition, any number of commands, state variables, warning semaphores, or messages can be added to the logical flow for purposes of enhanced utility, accounting, performance, measurement, or for providing troubleshooting aids, and the like. It is understood that all such variations are within the scope of the present invention.

Although particular embodiments of the invention have been described in detail, it is understood that the invention is not limited correspondingly in scope, but includes all changes, modifications and equivalents.

What is claimed is:

1. A method of producing an integrated circuit (IC) device layout corresponding to an IC device design, said method comprising:
   (a) generating an initial layout corresponding to the IC device design, said initial layout complying with a predetermined set of design rules;
   (b) simulating how structures within the initial layout will pattern on a wafer;
   (c) identifying portions of the simulated layout which demonstrates poor manufacturability; and (d) creating at least one design rule to disallow at least one portion of the layout identified in step (c).

2. The method of claim 1, said method further comprising:
(e) producing a layout complying with the design rules created at step (d); and
(f) simulating how structures within the layout produced at step (e) will pattern on a wafer.

3. The method of claim 2, said method further comprising:
repeating steps (c)–(f) until no portions of the simulated layout demonstrate poor manufacturability.

4. The method of claim 1, said method further comprising:
modifying at least one design rule of the predetermined set of design rules to disallow a portion of the layout identified in step (c).

5. The method of claim 1, said method further comprising:
performing at least one optical proximity correction (OPC) on the layout before performing step (b).

6. The method of claim 1, wherein step (c) includes performing optical rule checking (ORC) on the simulated layout.

7. The method of claim 6, wherein performing ORC includes checking at least one of aerial image metrics, resist image metrics, and post exposure bake metrics.

8. The method of claim 7, wherein the aerial image metrics include at least one of image log slope, contrast, minimum intensity, maximum intensity, and intensity at a given distance.

9. The method of claim 1, said method further comprising:
providing a graphical representation indicating portions of the simulated layout identified in step (c).

10. The method of claim 1, wherein the initial layout is embodied in a layout data file.

11. A method of producing design rules, said method comprising:
generating a plurality of parametrically varying layout patterns;
simulating how each layout pattern will pattern on a wafer;
classifying edges of structures within the simulated layout patterns based on manufacturability; and
creating design rules to disallow layout patterns demonstrating poor manufacturability.

12. The method of claim 11, wherein said step of generating said plurality of parametrically varying layout patterns includes:
selecting at least one layout test pattern;
generating a design spreadsheet, said design spreadsheet including a plurality of parametrically varying design parameters; and
generating a plurality of layout data files from the design spreadsheet and the layout test pattern.

13. The method of claim 12, wherein the varying design parameters include at least one of pitch, linewidth, tip-to-tip distance, tip-to-line distance, and length.

14. The method of claim 11, said method further comprising:
performing at least one optical proximity correction (OPC) on the geometric layouts prior to the simulating step.

15. The method of claim 11, wherein said step of classifying edges of structures within the simulated layout patterns based on manufacturability includes performing optical rule checking (ORC) on edges of structures within the simulated layout patterns.

16. The method of claim 15, wherein performing ORC includes checking at least one of aerial image metrics, resist image metrics, and post exposure bake metrics.

17. The method of claim 16, wherein the aerial image metrics include at least one of image log slope, contrast, minimum intensity, maximum intensity, and intensity at a given distance.

18. The method of claim 11, said method further comprising:
providing a graphical representation of the plurality of parametrically varying layout patterns, said graphical representation being indicative of layout patterns that fail at least one ORC demonstrating good and poor manufacturability.

19. The method of claim 18, wherein the graphical representation includes a plurality of identifiers which correspond to one or more layout patterns having a combination of at least two design parameters.

20. A method of generating a set of design rules for a next generation technology, said method comprising:
(a) providing a design library of layout patterns corresponding to a current technology;
(b) scaling one or more layout patterns of the design library to the next generation technology;
(c) generating simulation images of the scaled layout patterns from step (b);
(d) performing optical rule checks (ORCs) on the simulation images from step (c);
(e) identifying layout patterns which fail one or more ORCs; and
(f) creating one or more design rules to disallow the layout patterns identified in step (e).

21. The method of claim 20, wherein the step of performing ORCs includes checking at least one of edge intensity slope, maximum intensity, minimum intensity, contrast and critical dimension control for structures within the simulation images.

22. The method of claim 20, said method further comprising:
modifying at least one pre-existing design rule from the current technology to disallow a layout pattern identified in step (e).

* * * * *